(12) United States Patent
Leung et al.

(10) Patent No.: US 11,906,096 B2
(45) Date of Patent: *Feb. 20, 2024

(54) THERMAL EXPANSION COMPENSATING DEVICE AND METHOD OF USE

(71) Applicant: IPEX TECHNOLOGIES INC., Oakville (CA)

(72) Inventors: Martin Kwan Yu Leung, Oakville (CA); Ivan Lee Stiehl, Burlington (CA)

(73) Assignee: IPEX TECHNOLOGIES INC., Mississauga (CA)

( * ) Notice: Subject to any disclaimer, the term of this patent is extended or adjusted under 35 U.S.C. 154(b) by 241 days.

This patent is subject to a terminal disclaimer.

(21) Appl. No.: 17/511,973

(22) Filed: Oct. 27, 2021

(65) Prior Publication Data
US 2022/0049808 A1    Feb. 17, 2022

Related U.S. Application Data

(63) Continuation of application No. 16/176,009, filed on Oct. 31, 2018, now Pat. No. 11,193,618.

(30) Foreign Application Priority Data

Nov. 30, 2017  (CA) ................................ CA 2987390

(51) Int. Cl.
*F16L 51/00*    (2006.01)
*F16L 3/16*    (2006.01)
(Continued)

(52) U.S. Cl.
CPC ................ *F16L 51/00* (2013.01); *E03C 1/00* (2013.01); *F16L 3/16* (2013.01); *F16L 51/04* (2013.01);
(Continued)

(58) Field of Classification Search
CPC ... F16L 51/00; F16L 3/16; F16L 51/04; F16L 3/22; F16L 41/007; F16L 27/10;
(Continued)

(56) References Cited

U.S. PATENT DOCUMENTS

| 700,378 A | 5/1902 | Schmidt |
| D44,422 S | 7/1913 | Smith |

(Continued)

FOREIGN PATENT DOCUMENTS

| EP | 0 601 262 A1 | 6/1994 |
| EP | 0968351 | 11/2003 |

(Continued)

*Primary Examiner* — William S. Choi
(74) *Attorney, Agent, or Firm* — Jeffrey Pervanas; Riches, McKenzie & Herbert LLP

(57) ABSTRACT

A thermal expansion compensating device has a conduit with a first opening and a second opening for connection to a first pipe and a second pipe of a hot water system, respectively, the first and second pipes being formed by removing a section from a length of pipe of the hot water system. A pre-tensioning force is applied to the device to axially displace the first opening from the second opening until after connection of the openings of the pipes. A resiliently deformable pipe segment defines a portion of the conduit between the first opening and the second opening and is resiliently deformed to a tensioned position by the application of the pre-tensioning force. Once the hot water system is activated, the pipes axially thermally expand such that the first opening moves towards the second opening and the pipe segment moves from the tensioned position towards a rest position decreasing the stress on the device.

22 Claims, 10 Drawing Sheets

(51) Int. Cl.
  *F16L 51/04* (2006.01)
  *F16L 27/08* (2006.01)
  *F16L 27/10* (2006.01)
  *F16L 51/02* (2006.01)
  *E03C 1/00* (2006.01)

(52) U.S. Cl.
  CPC ........... *F16L 27/0837* (2013.01); *F16L 27/10* (2013.01); *F16L 51/024* (2013.01)

(58) Field of Classification Search
  CPC . F16L 51/024; F16L 27/0837; F16L 27/0845; F16L 27/0841; F16L 3/20; E03C 1/00; E03C 1/02; E03C 1/023; E03C 1/0408
  USPC .. 285/187, 13, 15, 179, 224, 18, 23, 24, 27, 285/64; 138/109, 155
  See application file for complete search history.

(56) References Cited

U.S. PATENT DOCUMENTS

| | | |
|---|---|---|
| 2,892,641 A | 6/1959 | Ford |
| 3,070,114 A | 12/1962 | Shabe |
| 3,077,958 A | 2/1963 | Grimsey, Jr. |
| 4,037,861 A | 7/1977 | Medney |
| 4,239,264 A | 12/1980 | Evans |
| 4,998,754 A | 3/1991 | Matsumoto |
| 5,032,290 A * | 7/1991 | Yamagata |
| 5,129,685 A | 7/1992 | Engel |
| 5,259,700 A | 11/1993 | Langner |
| D351,899 S | 10/1994 | Isber |
| 6,715,691 B2 * | 4/2004 | Park |
| 7,143,788 B2 | 12/2006 | Keyes |
| 7,308,906 B2 * | 12/2007 | Sinclaire |
| D601,230 S | 9/2009 | Misir |
| D675,298 S | 1/2013 | Gridley |
| D727,470 S | 4/2015 | Agar |
| D760,877 S | 7/2016 | Drake |
| 2013/0327437 A1 | 12/2013 | Feng |
| 2015/0069190 A1 | 3/2015 | Bartos |

FOREIGN PATENT DOCUMENTS

| | | |
|---|---|---|
| FR | 330 221 A | 8/1903 |
| FR | 2 218 528 A1 | 9/1974 |
| JP | 5020325 | 5/2012 |
| KR | 20100130542 | 12/2010 |
| WO | WO 2002057674 A1 | 7/2002 |

* cited by examiner

THERMAL EXPANSION COMPENSATING DEVICE AND METHOD OF USE

CROSS-REFERENCE TO RELATED APPLICATION

The present application is a continuation of, and claims the benefit under any applicable U.S. statute to, U.S. patent application Ser. No. 16/176,009 filed Oct. 31, 2018, titled Thermal Expansion Compensating Device and Method of Use.

This application incorporates by reference U.S. application Ser. No. 16/176,009, as if fully set forth herein.

FIELD OF THE INVENTION

This invention relates to pipe systems. More particularly, this invention relates to devices which compensate for thermal expansion of pipes in the pipe system.

BACKGROUND OF THE INVENTION

Thermal compensating devices and systems vary depending on the amount of thermal expansion and contraction expected in the pipe system they are meant to protect. In general, a linear pipe in a water system may buckle during changes in thermal operating temperatures if proper precautions are not taken. Prior art systems compensate for such thermal expansion by having horizontal members of various lengths to create loops. The difficulty with horizontal members however is that they may need to span over relatively large horizontal distances to absorb the anticipated thermal expansion. As such, many prior art devices cannot fit within a standard wall cavity between walls studs, such as two inch by four inch wall studs.

Thus, difficulties with prior art systems include that the wall studs or wall cavity must be interrupted, such as by drilling holes through them, to install and conceal the prior art thermal compensating devices behind the walls. This may also interfere with other utilities, such as electrical, heating and ventilation utilities, which are also present behind walls. Furthermore, during thermal expansion, the prior art thermal expansion compensating devices may expand or contract which could cause the prior art devices to move against wall studs or other utility items, potentially damaging the pipe system and/or the other utility devices. Furthermore, many of the prior art compensating devices are built in the field during installation from components that are not generally well suited for such applications, and may require more labour and time input is often required.

For example, attached FIG. 1 shows such a prior art compensating device where a prior art device, shown generally by reference numeral 1, has a loop 5 created by two horizontal members 2 and a vertical member 4. Moreover, the prior art compensating device 1 may be built from components used in the field, such as elbows 3, which may be stressed when thermal expansion occurs. To some extent, the length of the horizontal members 2 is intended to lessen the stress of the elbows 3. However, in this prior art device 1, the elbows 3 will be under stress for as long as the operating temperature of the system is above the ambient temperature, or at least above the temperature during installation of the device 1. In general, if such a prior art device 1 is used in a hot water heating system, for example, one would expect the elevated thermal operating temperature to subsist indefinitely, as this is the normal operating temperature of the hot water system, and, the thermal stresses caused by the operating temperature of the hot water will add to the physical stressors at the elbows 3, and other components, for the life of the system.

Accordingly, there is a need in the art for better thermal expansion compensating devices that are more compact so as to fit in a standard wall cavity, that do not require increase labour and time to install due to customization in the field, and, have decreased physical stress during use to improve longevity.

SUMMARY OF THE INVENTION

Accordingly, it is an object of this invention to at least partially overcome some of the disadvantages of the prior art.

Accordingly, in one of its aspects, this invention resides in a thermal expansion compensating device to decrease physical stresses in a water system due to thermal expansion, said device comprising: a fluid conduit having a first opening for connection to a first pipe of the water system and a second opening for connection to a second pipe of the water system, wherein said first opening is in fluid communication with the second opening, and, the first opening is substantially axially aligned with and axially separated from the second opening, with the first opening and the second opening configured to have a substantially aligned flow direction; a resiliently deformable pipe segment defining a portion of the conduit and located between the first opening and the second opening; a pre-tensioning member for applying a pre-tensioning force to substantially axially displace the first opening from the second opening by resiliently deforming the resiliently deformable pipe segment from a first rest position, where the resiliently deformable pipe segment is at rest, to a second tensioned position, where the resiliently deformable pipe segment is resiliently deformed due to the pre-tensioning force.

In a further aspect, the present invention resides in a method for installing the above-noted device in the water system, said water system having at least one linear pipe with a first anchored end anchored to a first rigid structure and a second anchored end anchored to a second rigid structure, the first anchored end being axially displaced from the second anchored end, said method of installing comprising: removing a section of the linear pipe between the first anchored end and the second anchored end forming the first pipe associated with the first anchored end and forming the second pipe associated with the second anchored end, said removed section corresponding to a distance of a first opening to second opening when said pre-tensioning member has axially displaced the first opening from the second opening by resiliently deforming the resiliently deformable pipe segment from the first rest position to the second tensioned position; connecting the first opening to the first pipe; connecting the second opening to the second pipe such that the fluid conduit permits fluid to flow from the first pipe through the thermal expansion compensating device to the second pipe; and after the first pipe has been connected to the first opening and the second pipe has been connected to the second opening, removing the pre-tensioning member.

In a further aspect, the present invention resides in a water system of a building, said building having more than one storey, said water system having at least one length of pipe anchored to the building at a first anchored end and a second anchored end axially displaced from the first anchored end, wherein a section of the at least one length of pipe is removed between the at least two anchored locations forming a first pipe associated with the first anchored location and a second pipe associated with the second anchored location, a thermal expansion compensating device to decrease physical stresses in the water system due to thermal expansion, said device comprising: a fluid conduit having a first opening for connection to the first pipe and a second opening for connection to the second pipe, wherein the first opening is in fluid communication with the second opening, and, the first opening is substantially axially aligned with and axially separated from the second opening, and with the first opening and the second opening configured to have a substantially aligned flow direction; a resiliently deformable pipe segment defining a portion of the conduit and located between the first opening and the second opening; wherein the resiliently deformable pipe segment is resiliently deformed to a tensioned position, where the resiliently deformable pipe segment is resiliently deformed due to a pre-tensioning force applied by a pre-tensioning member to axially displace the first opening from the second opening; wherein the first opening is connected to the first pipe and the second opening is connected to the second pipe while the resiliently deformable pipe segment is in the second tensioned position; and wherein the pre-tensioning force is removed after the first opening is connected to the first pipe and the second opening is connected to the second pipe.

Accordingly, in one aspect, a potential advantage of the present invention is that the pre-tensioning member pretensions the device prior to installation, such that the device will operate at minimal physical stress when the system reaches normal or maximum design operating temperatures. This may improve the longevity of the device, and, may also decrease other stresses in the system, including the pipes to which the device is attached.

A further potential advantage of at least some embodiments of the present invention is that the present invention comprises a unique geometry for converting thermal axial expansion of linear pipe segments of the pipe system into bending and unbending moment of a resiliently biased pipe segment. In this way, a more compact device can be used as opposed to the prior art systems. Furthermore, the device may experience less physical stress during operation of the hot water system at its operating temperature.

A further potential advantage of at least some embodiments of the present invention, is that the device has a unique geometry comprising substantially s-shaped fittings which interact with the resiliently deformable pipe segment to relieve physical stresses during use at operating temperatures above the ambient temperature and/or above the installation temperature. In other words, the resiliently deformable pipe segment may be pre-tensioned before and after installation, until the hot water system becomes active. Once the hot water system becomes active, the hot water system, including the device, approach its normal operating temperature which will cause the linear pipes of the system to thermally axially expand, thereby converting the thermal axial expansion of the linear pipes into a contraction of the device, de-stressing the resilient pipe segment and the device as a whole. In other words, the device and the resiliently deformable pipe segment in particular, would be at or near the rest position, with little to no stress, during the lifetime of use of the water system.

A further potential advantage of at least some embodiments of the present invention is that the pre-tensioning member may be releasably locked to the device, and in particular the substantially s-shape fittings. This permits the pre-tensioning member to be removed from an installed device and re-used on another uninstalled device by releasably locking the same pre-tensioning member to the other device. This decreases the overall operational cost of the device by permitting elements to be reused and recycle.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Preferred embodiments of the invention and its advantages can be understood by referring to the present drawings.

In the present drawings, like numerals are used for like and corresponding parts of the accompanying drawings.

Figure 1:
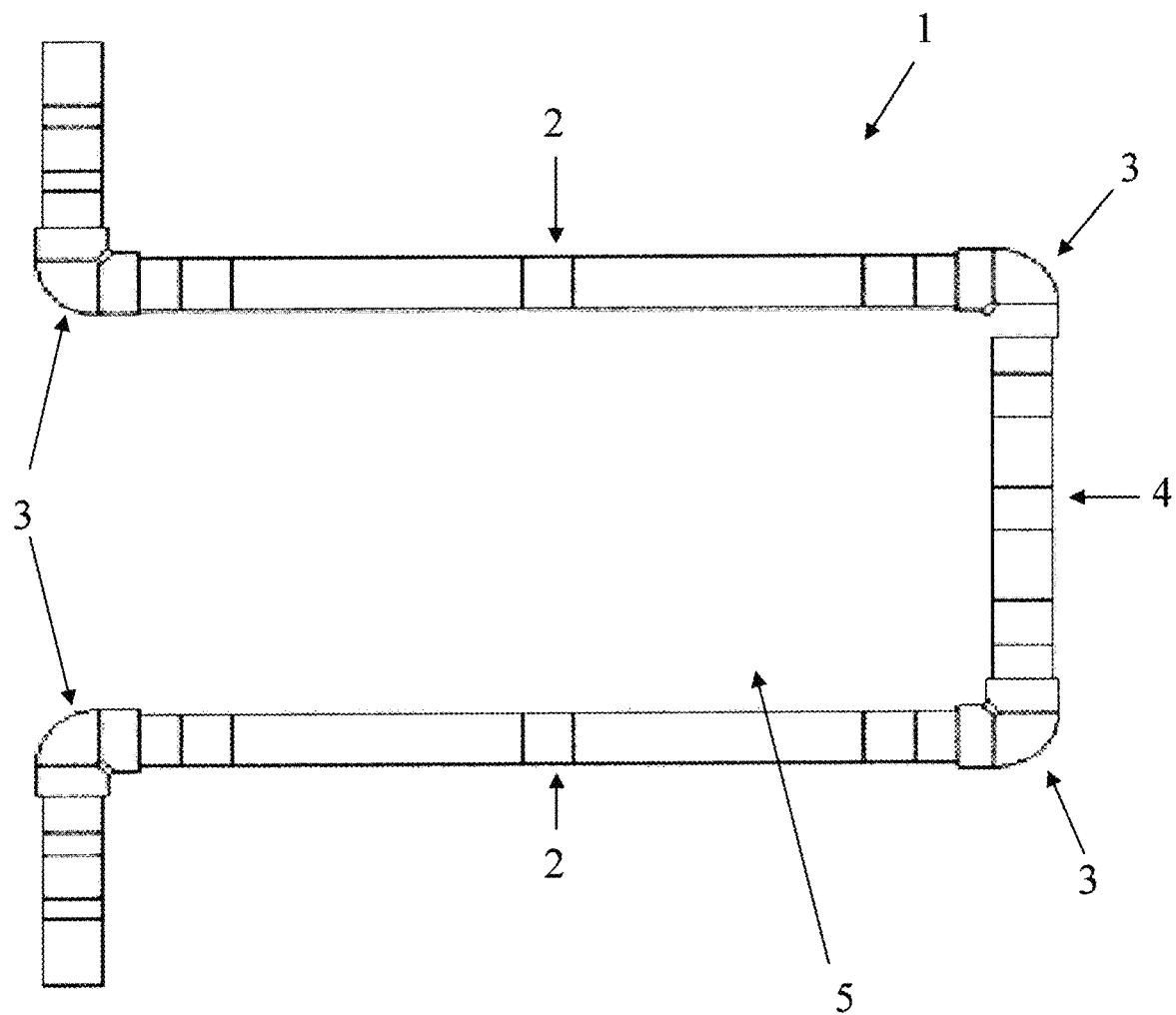
FIG. 1 illustrates a prior art device.
Figure 2:
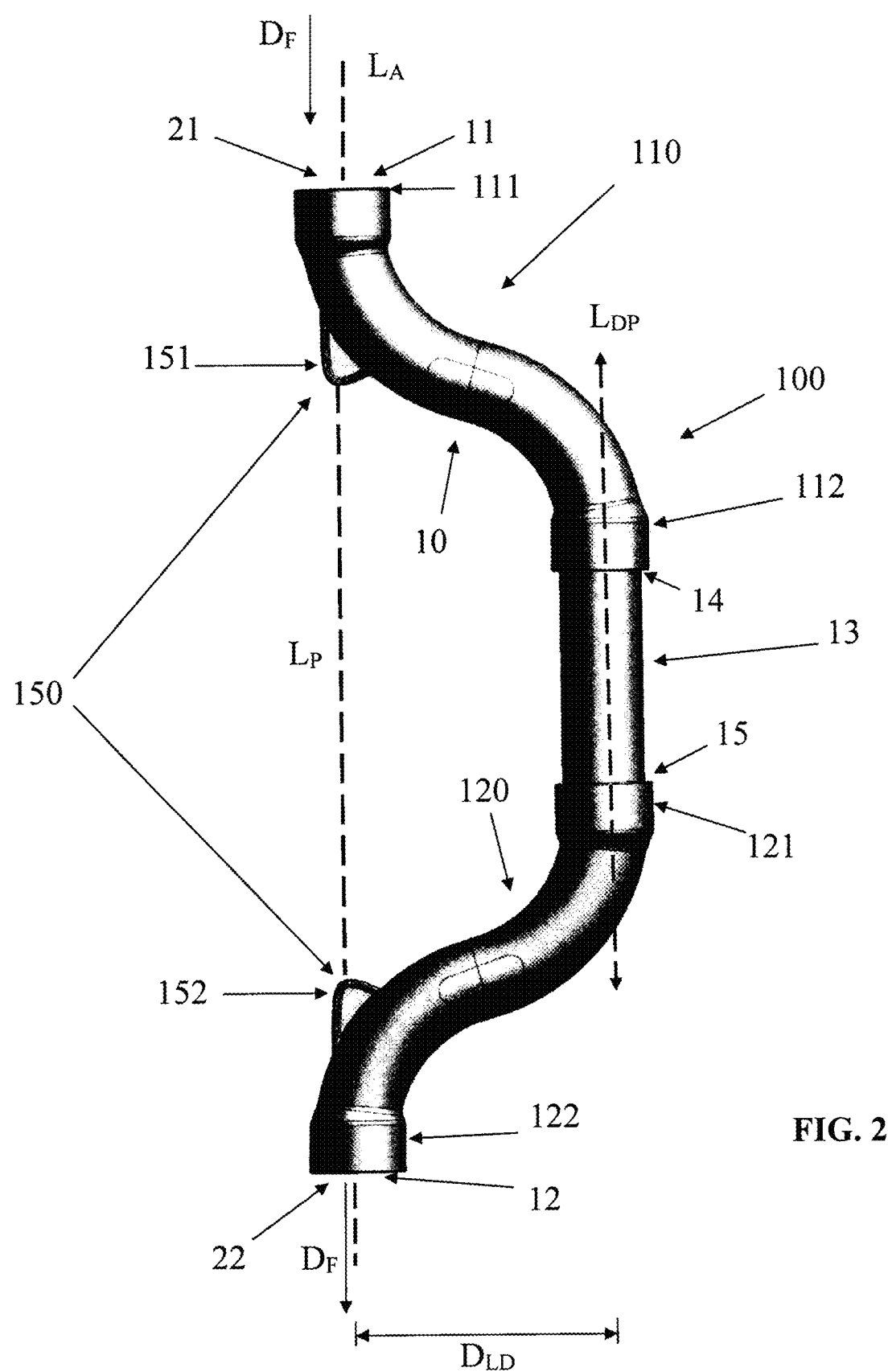
FIG. 2 is a side view of a fluid conduit of the thermal expansion compensating device without a pretension member releasable locked therein and the resiliently deformable pipe segment at the first rest position, according to one embodiment of the present invention.

As shown in FIG. 2, one embodiment of the present invention relates to a fluid conduit, shown generally by reference numeral 10, which is part of a thermal expansion compensating device, shown generally by reference numeral 100, but without a pre-tensioning member 130 locked therein. As illustrated in FIG. 2, the fluid conduit 10 has a first end 11 and a second end 12. The first end 11 may have a first opening 21, which in one preferred embodiment may act as an inlet opening. The second end 12 may have a second opening 22, which in one preferred embodiment may act as an outlet opening. The first opening 21 is connectable to a first pipe 501 of a water system and the second opening 22 may be connected to a second pipe 502 of the water system to permit fluid communication from the first pipe 501, through the first or inlet opening 21, through the fluid conduit 10 and out the second or outlet opening 22 to the second pipe 502. In this way, the fluid conduit 10 may be inserted between a length of pipe 500 of a water system by removing a section of the pipe. This is apparent at least in part by the first or inlet opening 21 being substantially axially aligned with, but axially separated from, the second or outlet opening 22. In this context, it is understood that the longitudinal axis is the dash line extending in a direction $L_A$ passing through the first opening 21 and out the substantially axially aligned second opening 22. It is also understood that the longitudinal axis $L_A$ in this case, would also be aligned with the longitudinal axis $L_{AP}$ of the longitudinal pipe 500 (shown in FIG. 6a) from the water system after the thermal expansion compensating device 100 is installed.

The thermal expansion compensating device 100 further comprises a resiliently deformable pipe segment, shown generally by reference numeral 13, which defines a portion of the conduit 10 and is located between the first or inlet opening 21 and the second or outlet opening 22. In this way, the resiliently deformable pipe segment 13 is located in between the two openings 21, 22. In a further preferred embodiment, the resiliently deformable pipe segment 13 is located substantially midway in the fluid conduit 10, and may be referred to as a middle pipe in such an embodiment.

The resiliently deformable pipe segment 13 is preferably resiliently deformable from a first rest position, where the resiliently deformable pipe segment is at rest and under no external physical stresses, to a second tensioned position, where the resiliently deformable pipe segment is resiliently deformed, such as due to a pre-tensioning force $F_{PT}$. In FIG. 2, the resiliently deformable pipe segment 13 is shown at the rest position which is apparent by there being no bend in the pipe segment 13. FIG. 2 illustrates, for example, how the fluid conduit 10 may appear at the time of manufacturing, before any external forces are applied.

Figure 3:
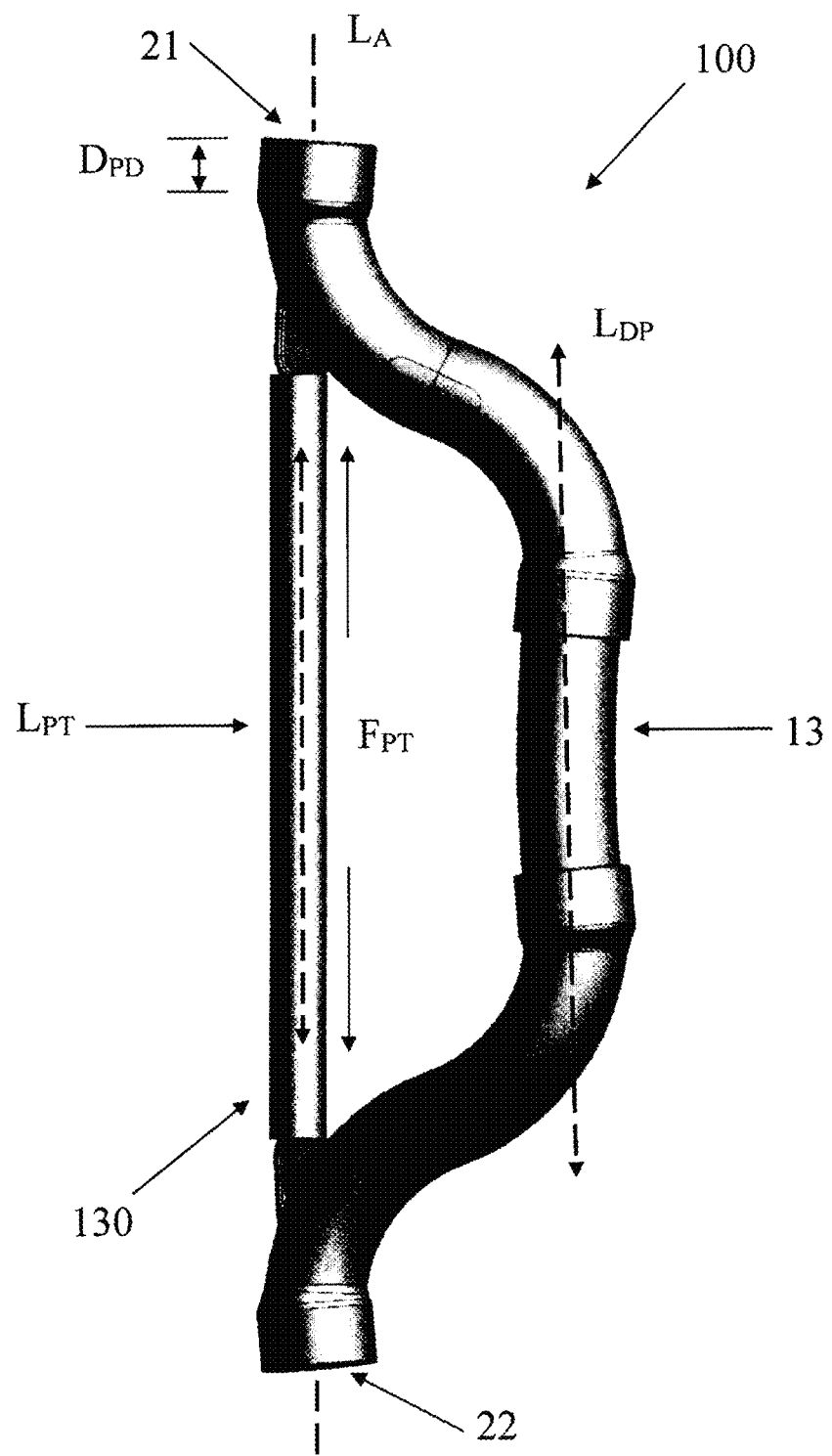
FIG. 3 is a side view of the fluid conduit of the thermal expansion compensating device shown in FIG. 2 showing the pre-tensioning member releasable locked therein and the resiliently deformable pipe segment at the second tensioned position, according to one embodiment of the present invention.

FIG. 3 illustrates a side view of the thermal expansion compensating device 100 including the pre-tensioning member 130 locked therein and applying a pre-tensioning force $F_{PT}$, to resiliently deform the resiliently deformable pipe segment 13 from the first rest position (shown in FIG. 2) to the second tensioned position, shown in FIG. 3. As illustrated in FIG. 3, the resiliently deformable pipe segment 13 in FIG. 3 is in the second tensioned position and has a bend caused by the pre-tensioning force $F_{PT}$. Applied pre-tensioning forces and the corresponding deformation of the resiliently deformable pipe segment 13, in at least one preferred embodiment, are set out in Table 1 and discussed below.

The thermal expansion compensating device 100 shown in FIG. 3 would be in a form for installation to a pipe 500 of a water system 600. In particular, the thermal expansion compensating device 100 would be connected to a longitudinal pipe 500 having a section 530 of the longitudinal pipe removed and the first opening 21 connected to the first pipe 501 of the longitudinal pipe 500 and the second opening 22 connected to the second pipe 502 of the longitudinal pipe 500. In other words, the thermal expansion compensating device 100 is intended to be installed to the first and second pipes 501, 502 of a water system while the resiliently deformable pipe segment 13 is in the second tensioned position and the pre-tensioning member 130 is applying the pre-tensioning force to substantially axially displace the first opening 21 from the second opening 22 a predetermined distance by resiliently deforming the resiliently deformable pipe segment 13 from the first rest position (shown in FIG. 2) to the second tensioned position. (Shown in FIG. 3).

After installation of the first opening 21 to the first pipe 501 and the second opening 22 to the second pipe 502, the pre-tensioning member 130 may be removed from the thermal expansion compensating device 100. However, because the first opening 21 is connected to the first pipe 501 and the second opening 22 is connected to the second pipe 502, the resiliently deformable pipe segment 13 will remain in the second tensioned position. In other words, the pre-tensioning member 130 is configured to be removed from the thermal expansion compensating device 100 after the first opening 21 has been connected to the first pipe 501 and the second opening 22 has been connected to the second pipe 502 which would permit the resiliently deformable pipe segment 13 to move from the second tensioned position towards the first rest position. However, such movement from the second tensioned position towards the first rest position would not initially occur precisely because the first opening 21 is connected to the first pipe 501 and the second opening 22 is connected to the second pipe 502. Therefore, the resiliently deformable pipe segment 13 will stay in the second tensioned position after installation and after removal of the pre-tensioning member 130 and until the first and second pipes 501, 502 have thermally axially expanded. In other words, because the resiliently deformable pipe segment 13 is permitted to move after the pre-tensioning member 130 is removed, as the water system is activated and approaches its higher operating temperature, the first pipe 501 and the second pipe 502 will begin to thermally expand. This thermal axial expansion of the first pipe 501 and the second pipe 502 will cause the first opening 21 to move axially towards the second opening 22, thereby decreasing the axial displacement of the first opening 21 from the second opening 22 and permitting the resiliently deformable pipe segment 13 to move from the second tensioned position towards the first rest position. In this way, as the water system and the pipes thereof, including the first pipe 501 and the second pipe 502, approach the operating temperature range of the hot water system, the thermal expansion compensating device 100, and the resiliently deformable pipe segment 13 in particular, will have a decreased physical stress, rather than an increased physical stress, due to the axial thermal expansion of the first pipe 501 and the second pipe 502.

Figure 4:
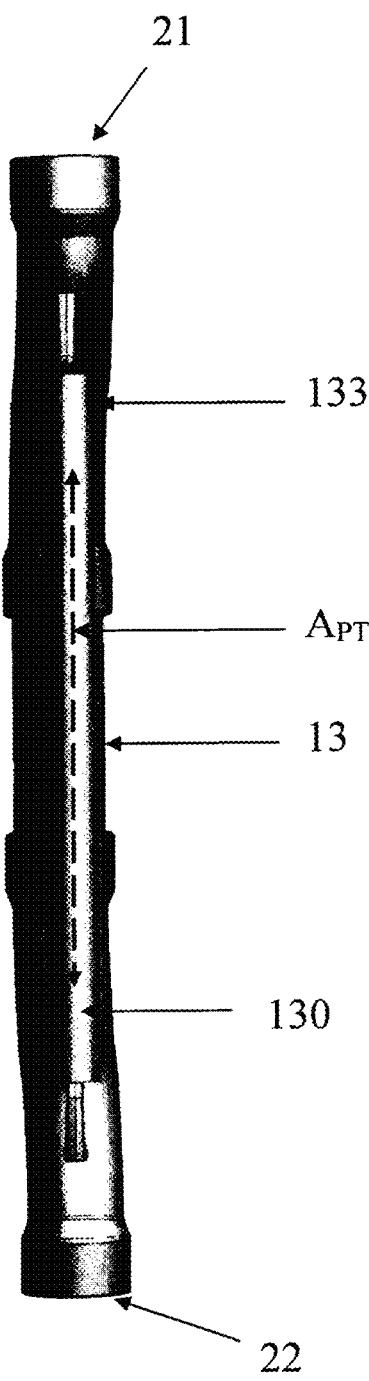
FIG. 4 is a front elevational view of the assembled thermal expansion compensating device with the fluid conduit and pre-tensioning member releasable locked therein and the resiliently deformable pipe segment at the second tensioned position, according to one embodiment of the present invention.

FIG. 4 illustrates a front end elevation view of the assembled thermal expansion compensating device 100 with the fluid conduit 10 and the pre-tensioning member 130 releasable locked therein and the resiliently deformable pipe segment 13 in the second tensioned position. As illustrated in FIGS. 2, 3 and 4, in a preferred embodiment, the pre-tensioning member 130 applies a pre-tensioning force $F_{PT}$ along a pre-tensioning axis $A_{PT}$ that is substantially parallel to a longitudinal axis $L_{DP}$ of the resiliently deformable pipe segment 13. In this way, the pre-tensioning force $F_{PT}$ converts axial displacement of the first opening 21 and the second opening 22 into bending moment of the resiliently deformable pipe segment 13. This pre-tensioning axis $A_{PT}$, in a preferred embodiment, is also preferably parallel, and in some cases aligned, with the longitudinal axis $L_A$ passing through the first opening 21 and the second opening 22.

Figure 5:
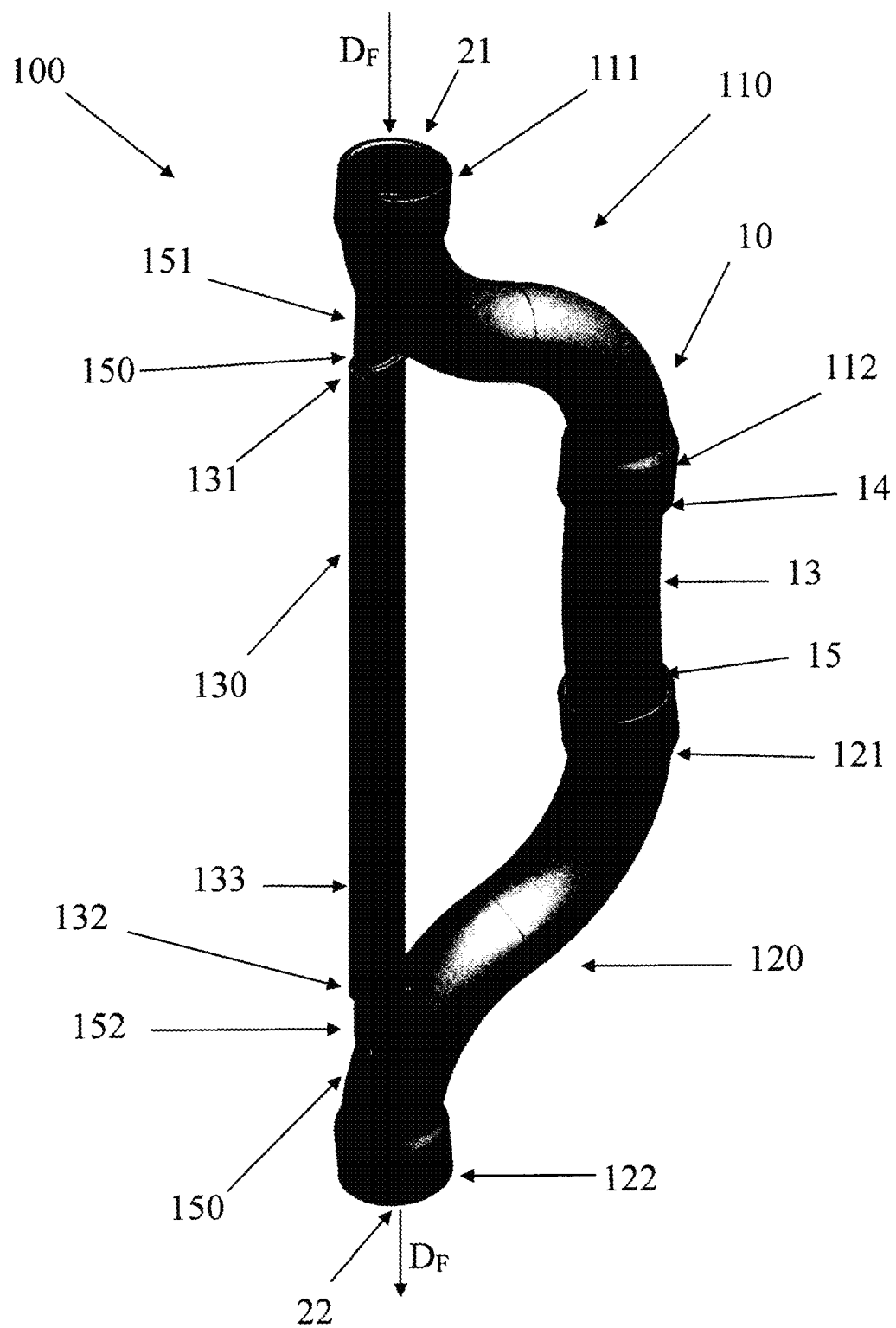
FIG. 5 is a top perspective view of the assembled thermal expansion compensating device with the fluid conduit and pre-tensioning member releasable locked therein and the resiliently deformable pipe segment at the second tensioned position, according to one embodiment of the present invention.

In a further preferred embodiment, the pre-tensioning member 130 is a rod-like member, such as a slender cylindrical rod or tube, shown generally by reference numeral 133 in FIGS. 4 and 5. It is understood however, that the pre-tensioning member 130 may be may shape, or be any type of member or device sufficient to apply the pre-tensioning force $F_{PT}$. In a preferred embodiment, the pre-tensioning force would range from 2000 pounds per square inch (psi) to about 4000 psi. Therefore, the pre-tensioning member 130, regardless of its form, including if it is a rod-like member 133, must be sufficient to apply a pre-tensioning force of 4000 psi to axially displace the first opening 21 from the second opening 22.

It is also understood, that in a preferred embodiment, the pre-tensioning member 130 is inserted into the device 100 and the pre-tensioning force $F_{PT}$ is applied, at the time of manufacture at the factory. However, the pre-tensioning member 130 may be inserted into the device 100 and the pre-tensioning force $F_{PT}$ could be applied at any time before installation of the device 100 to pipe 500 and connections of the openings 21, 22 to the first and second pipes 501, 502.

As also illustrated in FIGS. 2 and 3, the pre-tensioning force $F_{PT}$ will axially displace the first opening 21 from the second opening 22 by a predetermined distance $D_{PD}$. The predetermined distance $D_{PD}$, in a preferred embodiment, substantially corresponds to an anticipated axial thermal expansion of the first pipe segment 501 and the second pipe segment 502 caused by the water system reaching operating temperatures. (The predetermined distance $D_{PD}$ is illustrated in FIG. 3 in an exaggerated manner for ease of illustration). In a preferred embodiment, this predetermined distance may be about 0.55 inches in water systems having an anticipated operating temperature rise of 120° F. from the installation temperature.

In this regard, it is understood that the anticipated axial thermal expansion of the first pipe 501 and the second pipe 502 caused by the water system reaching the operating temperatures, could involve a significant temperature differential from the installation temperature, as in many cases, the water system would be installed in a building, or other structure which is not heated at the time of installation. Therefore, the installation temperature could be about 50° to 70° F., or even lower in norther climates approaching 20° to 40° F. depending on the time of year. Therefore, in a preferred embodiment, the predetermined distance $D_{PD}$ would need to account for an anticipated axial thermal expansion of the first pipe 501 and the second pipe 502, not merely from room temperature to the anticipated operating temperature of the water system, but from the installation temperature of the water system as a whole (which could be much lower than room temperature depending on a number of factors, including climate) to the anticipated operating temperature of the water system.

As illustrated in FIG. 5, the fluid conduit 10, is preferably further defined by a first fitting, shown generally by reference numeral 110, extending from a first inlet opening 111 to a first outlet opening 112 of the first fitting 110. The first inlet opening 111 of the first fitting 110, in a preferred embodiment, may preferably define the first or inlet opening 21 of the device 100. The first outlet opening 112 of the first fitting 110 is preferably rigidly fixed to an inlet opening 14 of the resiliently deformable pipe segment 13.

The fluid conduit 10 is preferably further defined by a second fitting, shown generally by reference numeral 120, extending from a second inlet opening 121 to a second outlet opening 122. The second inlet opening 121 of the second fitting 120 is preferably resiliently fixed to an outlet opening 15 of the resiliently deformable pipe segment 13 and the second outlet opening 122 of the second fitting 120 preferably defines the second or outlet opening 22 of the device 100.

In a further preferred embodiment, the first fitting 110 is a substantially s-shape fitting with the first inlet opening 111 and the first outlet opening 112 axially offset from each other by a lateral displacement distance $D_{LD}$ shown best in FIG. 2. Similarly, the second fitting 120 is preferably a substantially s-shape fitting with a second inlet opening 121 and a second outlet opening 122 axially offset from each other by the same lateral displacement distance $D_{LD}$. In this way, the first inlet opening 111 is axially aligned with the second outlet opening 122 and are configured to face away from each other as illustrated for instance in FIGS. 2 and 5. In this way, the first inlet opening 111, which also defines the first or inlet opening 21 of the device 100, and the second inlet opening 121, which also defines the second or outlet opening 22 of the device 100, are also substantially axially aligned with and axially separated from each other, and also configured to have a substantially aligned flow direction $D_F$ as illustrated for instance in FIGS. 2 and 5.

In a further preferred embodiment, the first fitting 110 and the second fitting 120 have a substantially identical shape and are both s-shape fittings. In this way, the device 100 is easier to manufacture as two of the components are identical. Furthermore, by the first and second fittings 110, 120 being identical, it is ensured that the lateral displacement distance $D_{LD}$ will be the same and also less than 6 inches. In this way, the lateral displacement distance $D_{LD}$ of the device 100 will also be less than 6 inches which will assist in installation of the device 100 in a wall cavity 703 as discussed more fully below.

In a further preferred embodiment, the device 100 comprises a releasable locking mechanism, shown generally by reference 150 in FIGS. 2 and 5, for releasably locking the pre-tensioning member 130 to the device 100. Preferably, the releasable locking mechanism 150 comprises protrusions 151 and 152 from the first fitting 110 and the second fitting 120, respectively.

Prior to connecting the first or inlet opening 21 to the first pipe 501 and the second or outlet opening 22 to the second pipe 502, the pre-tensioning member 130 is releasably locked to the device 100 by the releasable locking mechanism 150. In order for the pre-tensioning member 130 to better provide the pre-tensioning force $F_{PT}$ along the pre-tensioning axis $A_{PT}$, and substantially parallel to the longitudinal axis $L_{DP}$ of the resiliently deformable pipe segment 13, the protrusions 151, 152 are also preferably axially aligned with the longitudinal axis $L_A$ as illustrated for instance in FIG. 2.

In a further preferred embodiment, the first protrusion 151 extends from the first fitting 110 and the second protrusion 152 extends from the second fitting 120. The pre-tensioning member 130 is then releasable locked by the releasable locking mechanism 150 between the first fitting 110 and the second fitting 120 to apply the pre-tensioning force $F_{PT}$ therebetween and axially displace the first or inlet opening 21 of the device 100 away from the second or outlet opening 22 of the device 100 by resiliently deforming the resiliently deformable pipe segment 13 from the first rest position to the second tensioned position. Therefore, the resiliently deformable pipe segment 13 is in the second tensioned position when the pre-tensioning member 130 has been releasably locked by the locking mechanism 150. The pre-tensioning member 130, in a preferred embodiment, is locked or wedged between the protrusions 151, 152 as shown in FIG. 5 with the first end 131 of the pre-tensioning member 130 engaging the first protrusion 151 and the second end 132 of the pre-tensioning member 130 engaging the second protrusion 152. Preferably, the protrusions 151, 152 are angled or triangularly shaped to facilitate locking the ends 131, 132 of the pre-tensioning member 130 therebetween.

After the device 100 is installed to the water system by having the first or inlet opening 21 connected to the first pipe 501 and the second or outlet opening 22 connected to the second pipe 502, the pre-tensioning member 130 is configured to be releasably removed from the releasable locking mechanism 150. This can be done for instance by removing or dislodging the pre-tensioning member 130 from between the protrusions 151, 152 by axial or lateral movement of the ends 131 and/or 132. Once the pre-tensioning member 130 is removed from the releasable locking mechanism 150, the first or inlet opening 21 is permitted to move towards the second or outlet opening 22. However, this will not happen initially because the first or inlet opening 21 has been connected to a first pipe 501 and the second or outlet opening 22 has been connected to the second pipe 502. In this way, the first or inlet opening 21 and the second or outlet opening 22, while permitted to axially move towards each other because of removal of the pre-tensioning member 130, will not actually do so until the first pipe 501 and the second pipe 502 axially thermally expand. Once the water system becomes active and the first and second pipes 501, 502 begin to reach operating temperature and axially thermally expand, the first or inlet opening 21 will be permitted to axially move towards the second or outlet opening 22 and thereby resiliently deform the resiliently deformable pipe segment 13 from the second tensioned position towards the first rest position.

Once the pre-tensioning member 130 is removed from a device 100, the pre-tensioning member 130 can then be reused in another device 100. In other words, the pre-tensioning member 130 is configured to be releasably locked to another second device 100 after being released from the releasable locking mechanism 150 of a first device 100. This permits recycling or reuse of the pre-tensioning member 130 which is inherently environmental friendly and also decreases the cost of the device 100.

A method of installing and using the device 100 according to one preferred embodiment will now be described with reference to FIGS. 6a, 6b, 7, 8 and 9.

Figure 6A:
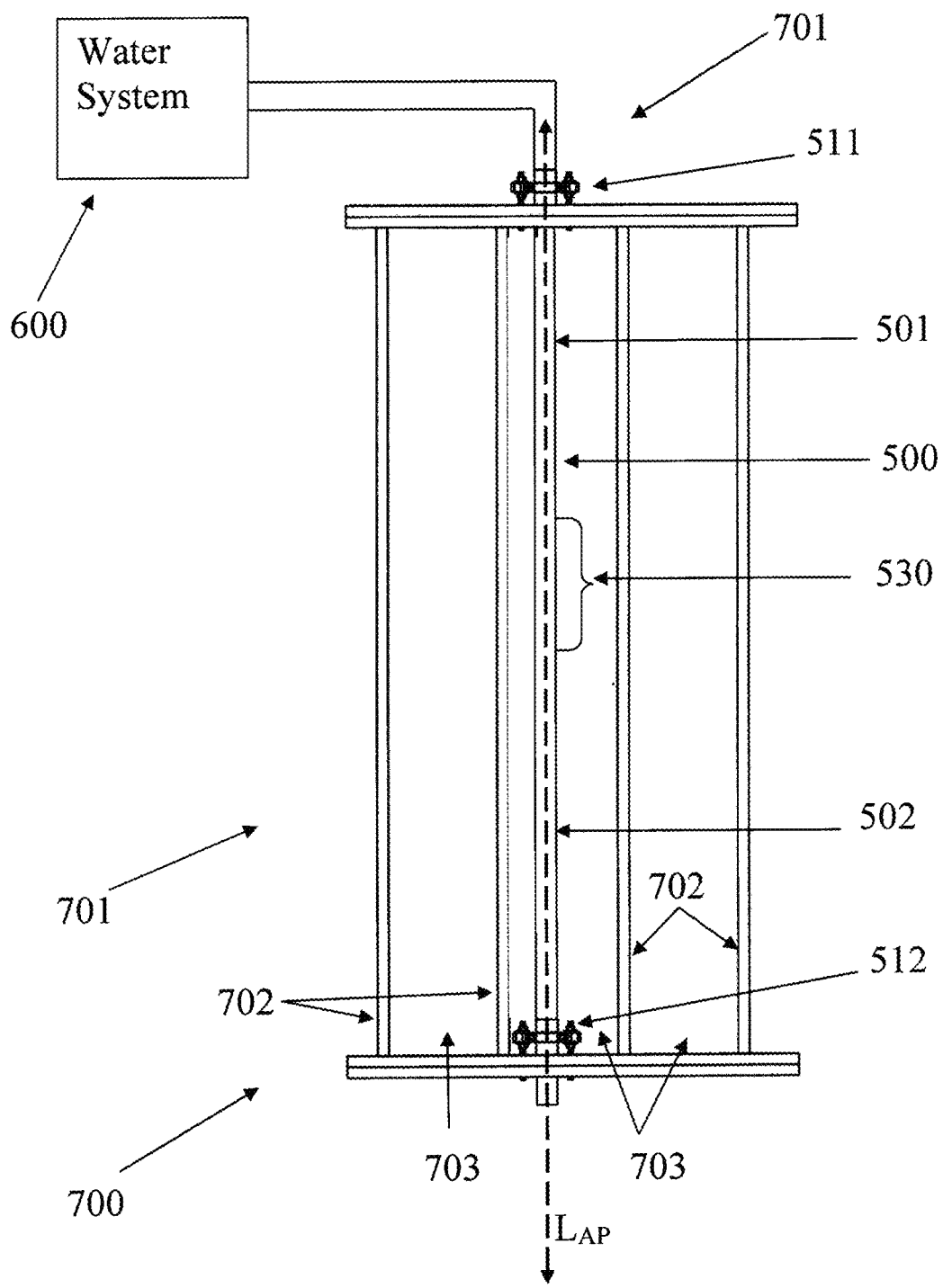
FIG. 6a is a pipe of a water system rigidly connected to two different locations of a building prior to installation of the device.

As illustrated in FIG. 6a, a building structure, shown generally by reference numeral 700 having at least one storey 701, has at least one linear pipe, shown generally by reference numeral 500. It is understood that each storey 701 of the building 700 may have a similar length of pipe 500. Each length of pipe 500 has a first anchored end, shown generally by reference numeral 511, and a second anchored end, shown generally by reference numeral 512. The first and second anchored ends 511, 512 are anchored to a rigid structure. In the embodiment where the length of pipe 500 is in a storey 701 of a building 700, the rigid structure is preferably the beginning of each storey 701 of the building 700.

The length of pipe 500 is connected or part of a water system shown generally by reference numeral 600. It is understood that when the length of pipe 500 is installed and the device 100 is installed, the water system is not active. In particular, there is no water in the water system 600 and it is not being heated. In fact, the building 700 may be in a construction stage and open to the elements. Each storey 701 also preferably has a wall cavity, shown generally by reference numeral 703. The wall cavity 703 contains the pipe 500 and is defined by vertical supports, shown generally by reference numeral 702. The supports 702 may be a wooden 2×4 length of lumber, if wood is used, or other type of building material, such as aluminium or stainless steel.

Figure 6B:
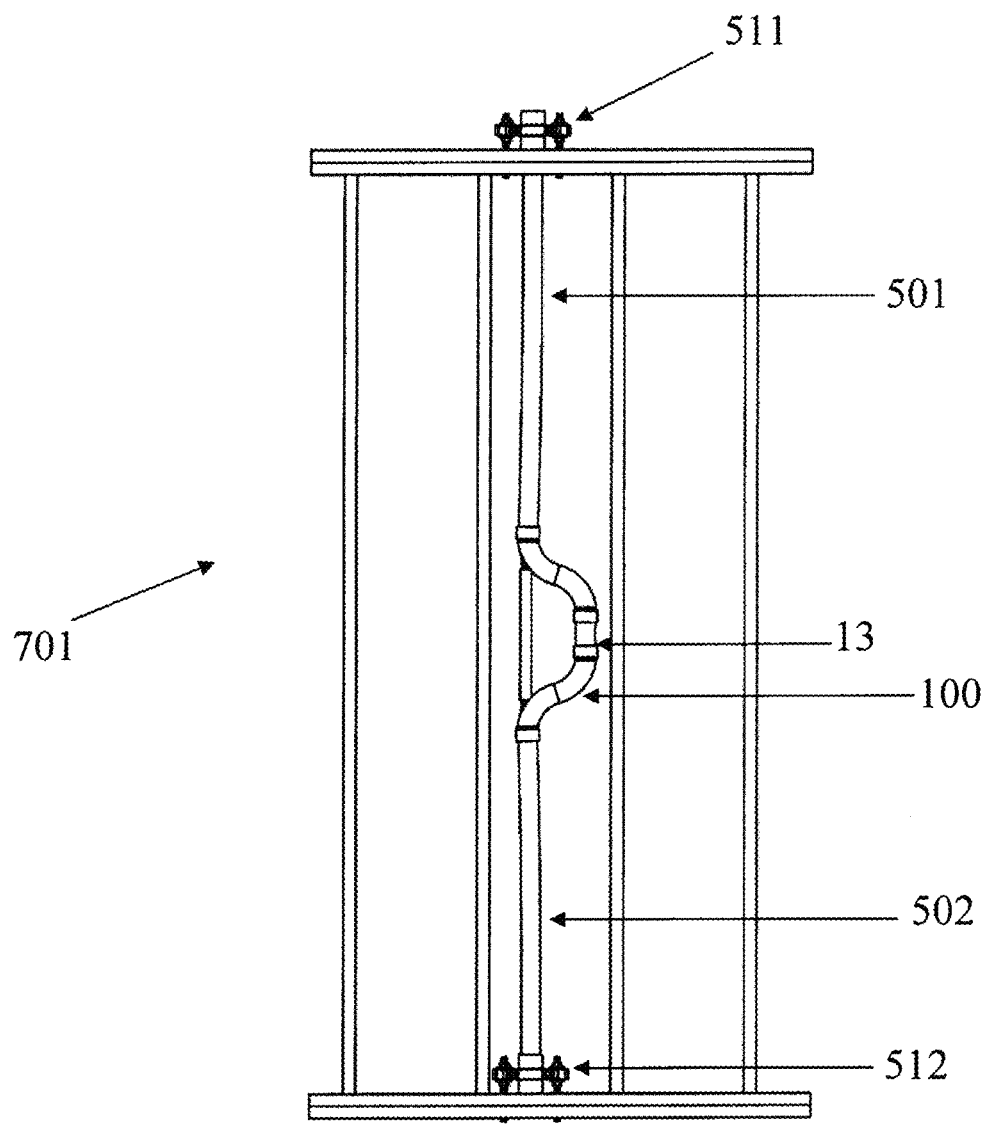
FIG. 6b is a side view of the assembled thermal expansion compensating device with the fluid conduit and pre-tensioning member according to one embodiment of the present invention with the device connected to two pipes in a storey of a building and the resiliently deformable pipe segment at the second tensioned position.

As also illustrated in FIG. 6a, the first anchored end 511 is axially displaced from the second anchored end 512. This axial displacement is along the longitudinal axis $L_{AP}$ of the pipe 500. A section, shown generally by reference numeral 530, of the linear pipe 500 is removed between the first anchored end 511 and the second anchored 512. Removing the section 530 of the pipe 500 forms the first pipe 501, associated with the first anchored end 511, and forms the second pipe 502, associated with the second anchored end 512. Preferably, the removed section 530 corresponds to a distance of the first or inlet opening 21 from the second or outlet opening 22 of the device 100 when the pre-tensioning member 130 has axially displaced the first or inlet opening 21 from the second or outlet opening 22 by resiliently deforming the resiliently deformable pipe segment 13 to the second tensioned position. The device 100 is then installed by connecting the first or inlet opening 21 to the first pipe 501 by known means, such as adhesives, and similarly, connecting the second or outlet opening 22 to the second pipe 502. This is done while the pre-tensioning member 130 is axially displacing the first or outlet opening 21 from the second or outlet opening 22 and this is illustrated in FIG. 6b. (It is noted the water system is not shown in FIG. 6b for ease of illustration).

Figure 7:
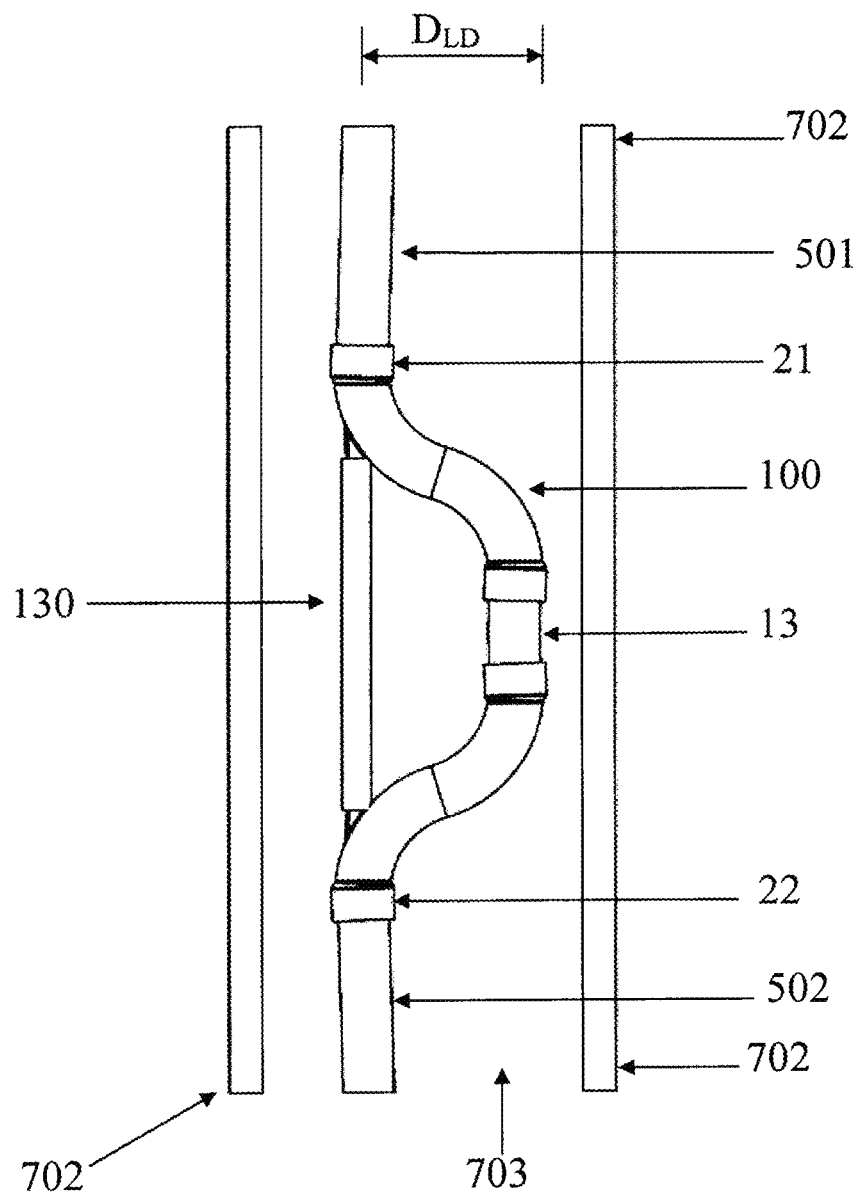
FIG. 7 is a detailed view of FIG. 6.

As illustrated in FIG. 6b, the resiliently deformable pipe segment 13 is in the tensioned position. FIG. 7 shows a detailed view of the device 100 shown in FIG. 6b. As also illustrated in FIG. 7, the lateral displacement distance $D_{LD}$ of the first and second fittings 110, 120 is less than the width of the wall cavity 703 and preferably less than 6 inches. In this way, the device 100 may be connected to a pipe 500 within a wall cavity 703 without disturbing the vertical supports 702 and preferably with minimal interference to other utilities in the building 700.

Figure 8:
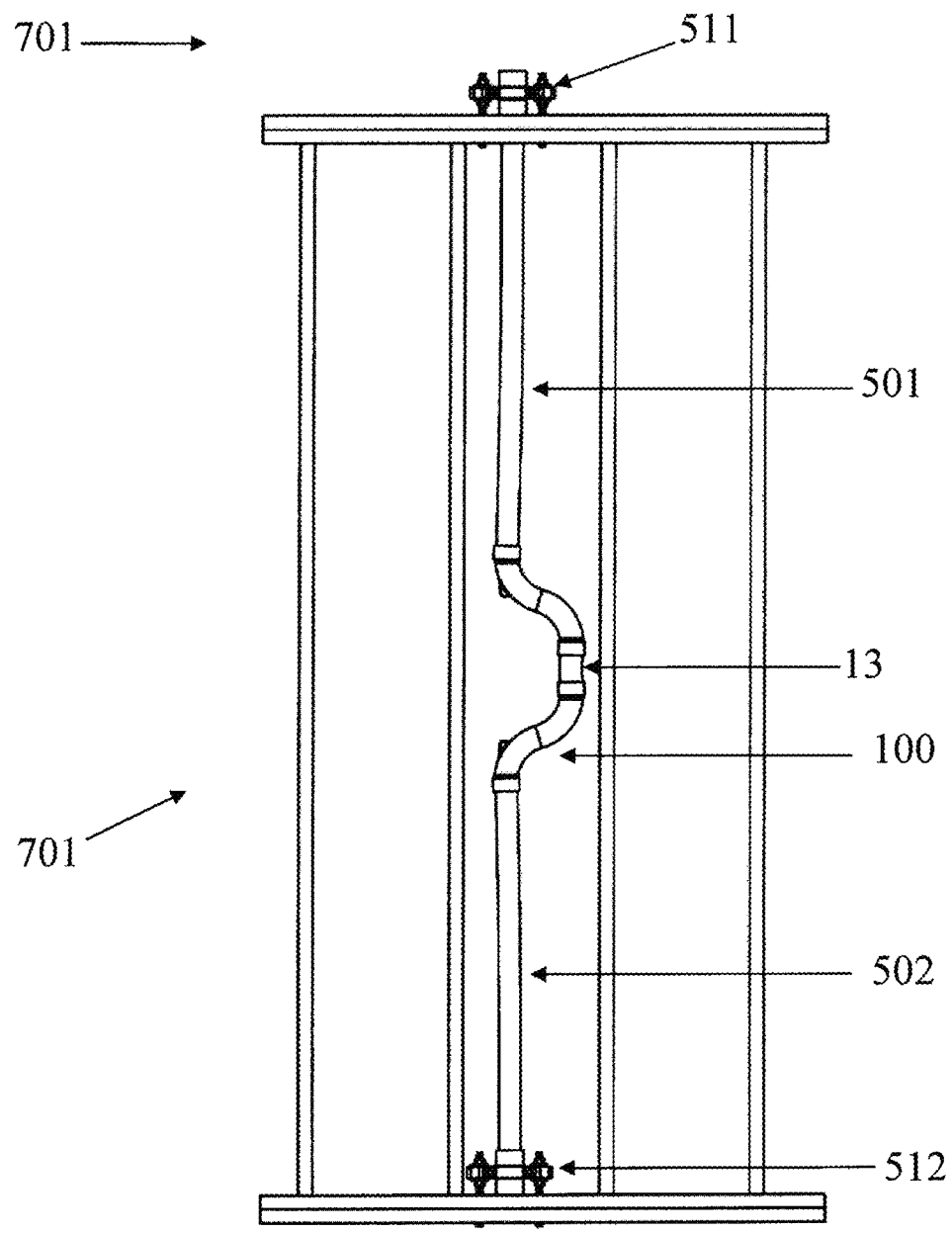
FIG. 8 is a side view of the installed thermal expansion device according to one embodiment of the present invention with the device connected to the pipes of the water system, the pre-tensioning member removed, but the hot water system not active yet, such that the pipes of the hot water system have not thermally expanded and the resiliently deformable pipe segment is still in the second tensioned position.

After the first pipe 501 has been connected to the first or inlet opening 21 and the second pipe 502 has been connected to the second or outlet opening 22, the pre-tensioning member 130 is removed, as illustrated for instance in FIG. 8. In FIG. 8, the removal of the pre-tensioning member 130 permits the axial movement of the first or inlet opening 21 towards the second or outlet opening 22. However, this will not occur at this time because the first pipe 501 is connected at the first end 511 and the second pipe 502 connected at the second end 512. In other words, even though the pre-tensioning member 130 is shown as being removed in FIG. 8, the resiliently deformable pipe segment 13 is still substantially in the second tensioned position. After the water system 600 is activated, the temperature of the first pipe 501 and the second pipe 502 will begin to increase towards the operating temperature of the water system 600. At this time, the first pipe 501 and second pipe 502 will begin to axially thermally expand in response to the activation of the water system 600 and the increase in temperature. As the pre-tensioning member 130 has now been removed, the first pipe 501 and the second pipe 502 are permitted to axially thermally expand causing the first or inlet opening 21 to axially move toward the second or outlet opening 22. This axial movement of the first or inlet opening 21 towards the second or outlet opening 22 permits the resiliently deformable pipe segment 13 to move from the second tensioned position towards the first rest position due to or, in response to, the axial thermal expansion of the first pipe 501 and the second pipe 502.

Figure 9:
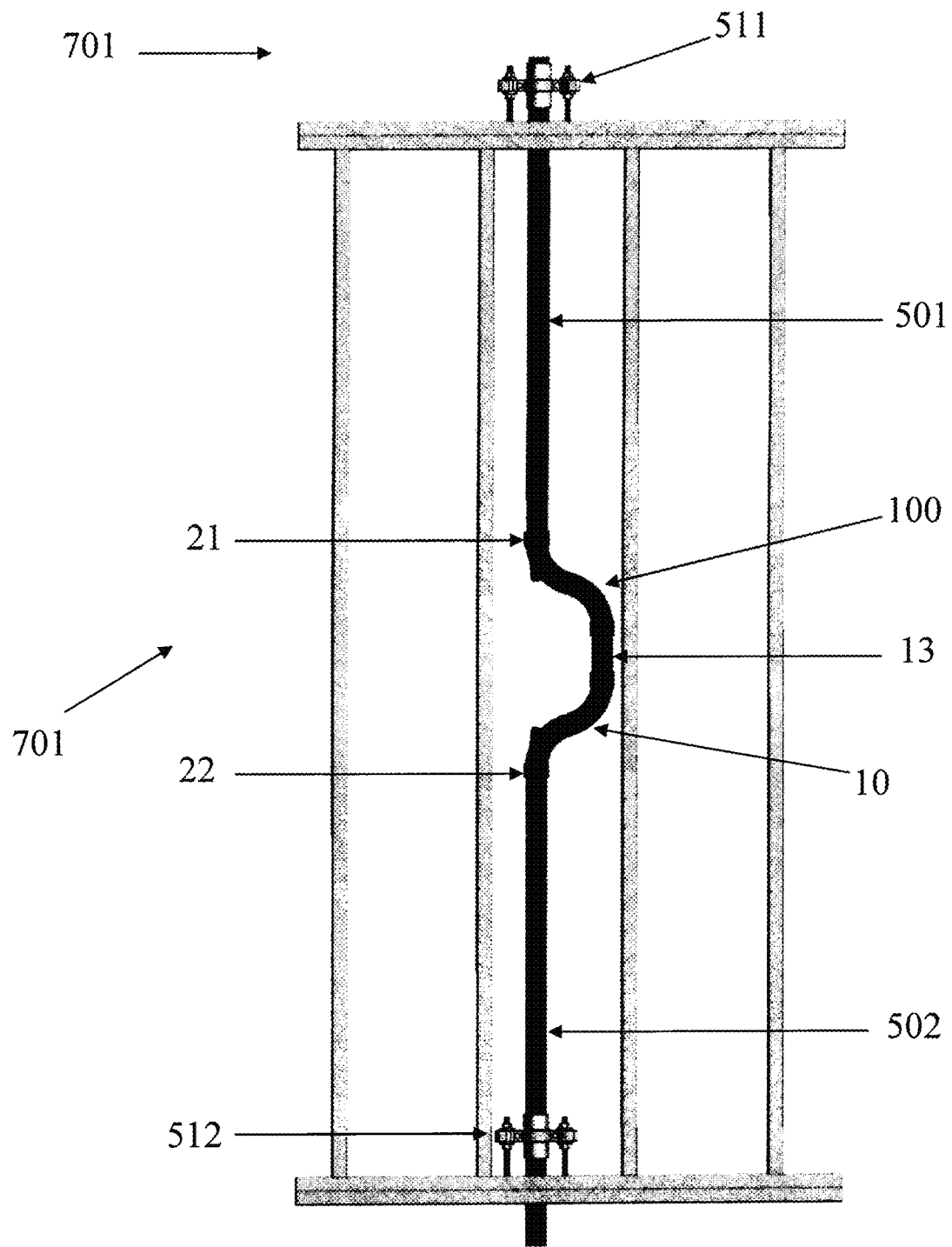
FIG. 9 is a side view of the installed thermal expansion device according to one embodiment of the present invention with the device connected to the pipes of the water system, the pre-tensioning member removed and the hot water system active, such that the pipes of the hot water system have thermally axially expanded and the resiliently deformable pipe segment has moved from the second tensioned position toward the first rest position.

FIG. 9 is a side view of the thermal expansion compensating device 100 installed to the pipe 500 of the water system 600 by having the first pipe 501 connected to the first opening 21 and the second pipe 502 connected to the second opening 22, and also with the hot water system 600 active, such that the pipes 501, 502 of the hot water system have thermally axially expanded from the anchored ends 511, 512 and the resiliently deformable pipe segment 13 has moved from the second tensioned position towards the rest position. Accordingly, after the hot water system 600 is activated, and hot water delivery begins to the length of pipe 500, thermal axial expansion of the first pipe 501 relative to the first anchored end 511 and the second pipe 502 relative to the second anchored end 512 will move the first opening 21 axially towards the second opening 22. In this way, the thermal axial expansion of the first and second pipes 501, 502 will axially displace the first opening 21 towards the second opening 22 and resiliently deform the resiliently deformable pipe segment 13 from the tensioned position towards the rest position.

It is understood that the resiliently deformable pipe segment 13 may not move completely to the first rest position depending on a number of factors, including the eventual operating temperature of the water system 600 the eventual operating temperature of the first pipe 501 and the second pipe 502, as well as other factors such as the temperature of the pipes 501, 502 at the time that the device 100 is installed and the relative initial length of the first and second pipes 501, 502. In any event, the device 100, as well as the resiliently deformable pipe segment 13, will be at a less physically stressed position than the second tensioned position after the activation of the water system 600 and for the majority of the time that the device 100 is being used. This decreases the overall stress on the device 100, as well as the first and second pipes 501, 502, and the overall water system 600.

It is understood that the pipe 501 may be one linear pipe of a plurality of lengths of pipe in the water system 600 in a structure, such as the building 700. Each length of pipe 500 may have a corresponding first anchored end 511 and a second anchored end 512, anchored to a corresponding first and second rigid structure of the building 700. The same method described above and illustrated for instance in FIGS. 6a, 6b, 7, 8 and 9 may be repeated for each length of pipe. In particular, in the case of a building 700, for each length of pipe 500, there may be a corresponding first anchored end 511 at the beginning of one storey 701 in the building 700 and a corresponding second anchored end 512 at the beginning of an adjacent storey 701 in the building 700. It is understood that a corresponding device 100 may be attached to two or more lengths of pipe 500 in the building 700. A section 530 of each length of pipe 500 to which the device 100 is to be attached may be removed, as discussed above, between the at least two corresponding anchored ends 511, 512 forming the corresponding first pipe 501 associated with the first anchored end 511 and the corresponding second pipe 501 associated with the second anchored end 512. It is understood that in general, each storey 701 would be adjacent storeys of the building 700 and the length of pipe 500 will be anchored at a corresponding location at each storey 701. In each case, the lateral displacement distance $D_{LD}$ of the first or inlet 21 and the second outlet opening 22 of the first and second fitting 110, 120, respectively, would be less than 6 inches, and, in any event less that the distance between the adjacent first and second vertical supports 702, such that the device 100 may fit within the corresponding wall cavity 703 in each storey 701.

As also indicated above, once the pre-tensioning member 130 has been removed from the device 100, the pre-tensioning member 130 may be releasably locked to another uninstalled thermal expansion compensating device 100 that has not yet been installed in a water system. This decreases the overall cost of operating the device 100 and also provides a more environmentally friendly method and device.

Furthermore, the following Table 1 shows experimental results using the thermal expansion compensating device 100 according to one preferred embodiment with different temperature rises.

TABLE 1

| Temperature Increase from Installation | | highest stress on device ($F_{PF}$) | inlet, outlet opening axial displacement ($D_{PD}$) |
|---|---|---|---|
| ° C. | ° F. | (psi) | (in) |
| 10 | 18 | 3993 | 0.080 |
| 20 | 36 | 3578 | 0.160 |
| 30 | 54 | 2973 | 0.250 |
| 40 | 72 | 2372 | 0.330 |
| 50 | 90 | 1774 | 0.410 |
| 60 | 108 | 1179 | 0.490 |
| 70 | 120 | 588 | 0.550 |

As shown in Table 1, different temperature rises and the corresponding pre-tensioning force $F_{PT}$ in pounds per square inches, are tabulated. As shown in Table 1, as the temperature rises, the corresponding force $F_{PT}$ decreases, representing the movement of the first opening 21 axially toward the second opening 22 due to axial thermal expansion of the pipes 501, 502 and the movement of the resiliently deformable pipe segment 13 from the second tensioned position towards a less stressed position where the force $F_{PT}$ is less. As also illustrated in Table 1, the resiliently deformable pipe segment 13 may not reach the rest position (where the pre-tensioning force $F_{PT}$ is zero) and a residual pre-tensioning force $F_{PT}$ may still apply, but this would be much less than the force on the device 100 had no pre-tensioning force $F_{PT}$ been initially applied to the device 100.

Table 1 also illustrates the corresponding axial displacement $D_{PD}$ as the temperature rises. It is understood that this displacement results from the thermal axial expansion of the first and second pipes 501, 502 and decreases the axial displacement between the first or inlet opening 21 and the second or outlet opening 22 initially caused by applying the pre-tensioning force $F_{PT}$.

It is understood that while reference has been made to an inlet and an outlet of the device as a whole, as well as components of the device such as the s-shape fittings, the device in a preferred embodiment is symmetrical. In other words, while reference has been made to an inlet opening and an outlet opening, this has been done merely for easy of description and the inlet opening can also act as the outlet opening and the outlet opening can also act as the inlet opening. In other words, the device in a preferred embodiment, is symmetrical across the lateral axis perpendicular to the longitudinal axis.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. In a water system having at least one length of pipe anchored at a first anchored end and a second anchored end axially displaced from the first anchored end, and having a section of the at least one length of pipe removed between the first anchored end and the second anchored end forming a first pipe associated with the first anchored end and a second pipe associated with the second anchored end, a thermal expansion compensating device to decrease physical stresses in the water system due to thermal expansion, said device comprising:
   a fluid conduit having a first opening for connection to the first pipe and a second opening for connection to the second pipe, wherein the first opening is in fluid communication with the second opening, and, the first opening is substantially axially aligned with and axially separated from the second opening, and with the first opening and the second opening configured to have a substantially aligned flow direction;
   a resiliently deformable pipe segment defining a portion of the conduit and located between the first opening and the second opening;
   a pre-tensioning member for applying a pre-tensioning force to substantially axially displace the first opening from the second opening by resiliently deforming the resiliently deformable pipe segment from a first rest position, where the resiliently deformable pipe segment is at rest, to a second tensioned position, where the resiliently deformable pipe segment is resiliently deformed due to the pre-tensioning force;
   wherein the first opening is connected to the first pipe and the second opening is connected to the second pipe while the resiliently deformable pipe segment is in the second tensioned position.

2. The device as defined in claim 1, wherein after the pre-tensioning member is removed, the water system is activated and hot water delivery begins to the at least one lengths of pipe, thermal axial expansion of the first pipe relative to the first anchored end and the second pipe relative to the second anchored end resiliently deform the resiliently deformable pipe segment from the second tensioned position towards a less stressed position.

3. The device as defined in claim 2, wherein the pre-tensioning force axially displaces the first opening from the second opening a predetermined distance, and, the predetermined distance substantially corresponds to an anticipated axial thermal expansion of the first pipe and the second pipe caused by the water system reaching operating temperatures.

4. The device as defined in claim 1, wherein the conduit is further defined by a first substantially s-shape fitting extending from a first inlet opening to a first outlet opening, the first inlet opening of the first substantially s-shape fitting forming the first inlet opening of the device and the first outlet opening of the first substantially s-shape fitting rigidly fixed to an inlet opening of the resiliently deformable pipe segment;
   wherein the conduit is further defined by a second substantially s-shape fitting extending from a second inlet opening to a second outlet opening, the second inlet opening of the second fitting rigidly fixed to an outlet opening of the resiliently deformable pipe segment and the second outlet opening of the second fitting defining the second outlet opening of the device;
   wherein the first inlet opening and the first outlet opening of the first substantially s-shape fitting is axially offset from each other by a lateral displacement distance of less than 6 inches; and
   wherein the second inlet opening and the second outlet opening of the second substantially s-shape fitting is axially offset from each other by the lateral displacement distance.

5. The device as defined in claim 4, wherein the at least one length of pipe is installed within a storey of a building with the first anchored end at one end of the storey and the second anchored end at an adjacent storey of the building;
   wherein the first pipe and the second pipe are contained within a wall cavity of the storey between a first vertical support and a second vertical support;
   wherein the lateral displacement distance of the first inlet opening and second inlet opening is less than the distance between the first vertical support and the second vertical support.

6. The device as defined in claim 1, wherein the at least one length of pipe is one of a plurality of lengths of pipe of the water system in a building, each length of pipe having the first anchored end at the beginning of a storey in the building and the second anchored end at the beginning of an adjacent storey in the building, wherein a corresponding device is attached to two or more lengths of pipe in the building, wherein a section of each length of pipe to which the device is to be attached is removed between corresponding first and second anchored ends forming a corresponding first pipe associated with the first anchored end and a corresponding second pipe associated with the second anchored end.

7. The device as defined in claim 1, wherein, after the pre-tensioning member is removed, and as the water system approaches the maximum anticipated operating temperature, the resiliently deformable pipe segment is resiliently deformed by the axial thermal expansion of the first pipe and second pipe from the tensioned position towards the first rest position.

8. The device as defined in claim 1 wherein the resiliently deformable pipe segment is resiliently deformed to the second tensioned position due to a pre-tensioning force applied by the pre-tensioning member to axially displace the first opening from the second opening.

9. The device as defined in claim 1, wherein the pre-tensioning member is removed after the first opening is connected to the first pipe and the second opening is connected to the second pipe.

10. The device as defined in claim 9 wherein, after the pre-tensioning member is removed, the resiliently deformable pipe segment remains in the second tensioned position because the first opening is connected to the first pipe and the second opening is connected to the second pipe.

11. The device as defined in claim 10 wherein, after the pre-tensioning member is removed, the resiliently deformable pipe segment remains in the second tensioned position until the water system is activated and hot water delivery begins to the at least one lengths of pipe, such that thermal axial expansion of the first pipe relative to the first anchored end and thermal axial expansion of the second pipe relative to the second anchored end resiliently deform the resiliently deformable pipe segment from the second tensioned position towards the first rest position.

12. The device as defined in claim 1, wherein the pre-tensioning member applies the pre-tensioning force along a pre-tensioning axis substantially parallel to a longitudinal axis of the resiliently deformable pipe segment to convert axial displacement of the first opening and the second opening into bending moment of the resiliently deformable pipe segment.

13. The device as defined in claim 1, wherein the pre-tensioning member is a substantially rod-like member extending along a pre-tensioning axis which is substantially axially aligned with the first opening and the second opening to axially apply the pre-tensioning force.

14. The device as defined in claim 1, wherein the pre-tensioning member is configured to be removed, after the first opening has been connected to the first pipe and the second opening has been connected to the second pipe, permitting the resiliently deformable pipe segment to move from the second tensioned position towards the first rest position at least partially due to axial thermal expansion of the first pipe and the second pipe.

15. The device as defined in claim 1, wherein the pre-tensioning member axially displaces the first opening from the second opening a predetermined distance; and
wherein the predetermined distance substantially corresponds to an anticipated axial thermal expansion of the first pipe and the second pipe caused by the water system reaching operating temperatures.

16. The device as defined in claim 15, wherein the predetermined distance is up to about 0.55 inches in water systems having anticipated operating temperature increase of 120° F.

17. The device as defined claim 1, wherein the pre-tensioning force ranges from 2000 psi to about 4000 psi.

18. The device as defined in claim 1, wherein the conduit is further defined by a first fitting extending from a first inlet opening to a first outlet opening, the first inlet opening of the first fitting defining the first opening of the device and the first outlet opening of the first fitting rigidly fixed to an inlet opening of the resiliently deformable pipe segment; and
wherein the conduit is further defined by a second fitting extending from a second inlet opening to a second outlet opening, the second inlet opening of the second fitting rigidly fixed to an outlet opening of the resiliently deformable pipe segment and the second outlet opening of the second fitting defining the second opening of the device.

19. The device as defined in claim 18, wherein the first fitting is a substantially s-shape fitting with the first inlet opening and the first outlet opening axially offset from each other a lateral displacement distance of less than 6 inches; and
wherein the second fitting is a substantially s-shape fitting with the second inlet opening and the second outlet opening axially offset from each other by the lateral displacement distance such that the first inlet opening is axially aligned with the second outlet opening, and, are configured to face away from each other.

20. The device as defined in claim 19, wherein the first s-shape fitting is substantially identical to the second s-shape fitting.

21. The device as defined in claim 19, further comprising:
a releasable locking mechanism for releasably locking the pre-tensioning member between the first substantially s-shape fitting and the second substantially s-shape fitting;
wherein, prior to connecting the first opening to the first pipe and the second opening to the second pipe, the pre-tensioning member is releasably locked by the releasable locking mechanism between the first substantially s-shape fitting and the second substantially s-shape fitting to apply the pre-tensioning force therebetween and axially displace the first opening of the device away from the second opening of the device by resiliently deforming the resilient deformable pipe segment from the first rest position to the second tensioned position; and
wherein after the first opening has been connected to the first pipe and the second opening connected to the second pipe, the pre-tensioning member is configured to be releasable removed from the releasable locking mechanism permitting axial movement of the first opening towards the second opening and resilient deformation of the pipe segment from the second tensioned position towards a less stressed position as the first pipe and the second pipe axially thermally expand.

22. The device as defined in claim 21, wherein the pre-tensioning member is configured to be releasably locked to another device after being released from the releasable locking mechanism.

* * * * *